United States Patent [19]

Yamada

[11] Patent Number: 5,622,247
[45] Date of Patent: Apr. 22, 1997

[54] PALLET CHANGER

[75] Inventor: Shigeru Yamada, Takaoka, Japan

[73] Assignee: Kitamura Machinery Co., Ltd., Japan

[21] Appl. No.: 341,064

[22] Filed: Nov. 16, 1994

[51] Int. Cl.$^6$ ................................................ B65G 37/00
[52] U.S. Cl. ..................... 198/346.1; 29/33 P; 198/345.3
[58] Field of Search .......................... 198/346.1, 345.3, 198/465.2, 803.01; 414/222; 29/33 P

[56] References Cited

U.S. PATENT DOCUMENTS

| | | | |
|---|---|---|---|
| 4,637,108 | 1/1987 | Murata et al. | 198/346.1 |
| 4,797,052 | 1/1989 | Ohta et al. | 198/346.1 |
| 5,438,740 | 8/1995 | Carr et al. | 29/33 P |

*Primary Examiner*—Joseph E. Valenza
*Attorney, Agent, or Firm*—Lorusso & Loud

[57] ABSTRACT

A pallet changer of the type in which a pallet is exchanged between a pallet changer body and a table of a machine tool. A circular groove is provided on the bottom side of the pallets and plate members having a shape corresponding to that of the groove are provided on the pallet changer body and the table. The pallets are rotatable through a path, defined between the plate of the pallet changer body and the plate of the machine tool table.

3 Claims, 9 Drawing Sheets

= 5,622,247 =

PALLET CHANGER

BACKGROUND OF THE INVENTION

This invention relates to a pallet changer of the type in which a pallet is moved between a pallet changer body and a table of a machine tool.

Generally, the pallet changer is constructed such that it has an endless track, and several pallets are simultaneously moved along the endless track. A mechanism for switching pallets is provided at a fixed position on the track. This pallet replacing mechanism is used to remove the pallets set on the table of the machine tool to the fixed position, and to carry the pallets from the pallet changer onto the table of the machine tool.

Normally, the endless track is formed into an oval shape or a shape close thereto by a chain or a sprocket. Further, the pallet replacing mechanism has a linear rail track, and the pallets are reciprocatingly moved along the rail track. The reciprocating movement can be carried out by utilizing, for example, a cylinder-piston mechanism or a rack-pinion mechanism. In the pallet replacing system of the type in which the pallets reciprocatingly move in substantially a straight line as described above, it is necessary to keep the destination or the terminal for the pallets vacant without fail.

In the conventional pallet changer, the replacement of pallets is carried out in the following three steps. That is, first, the used pallets set on the table of the machine tool are removed onto vacant places on the pallet changer. Next, the pallets are moved along the endless track to index the pallet to be used next. Finally, a pallet is moved onto the table of the machine tool.

In the pallet replacing operation as described above, attention should be paid to the fact that the destination of the pallets is vacant, as previously mentioned. That is, no pallets should be present at the terminus of the pallet movement. As described above, in the conventional pallet changer, the three operations have to be separately carried out in said order. Accordingly, limits are naturally imposed on the speed of the pallet replacing operation.

Further, in the conventional pallet changer, there exists a problem in that, since main parts of the pallet changer are fixed at the forward portion of the table of the machine tool, it is difficult for an operator to closely approach the table.

SUMMARY OF THE INVENTION

It is an object of the present invention to provide a pallet changer in which the pallet replacing operation can be considerably speeded up.

It is a further object of the present invention to provide a pallet changer in which, at the time when not removing and replacing pallets, an operator is able to move close to the table of the machine tool without being hindered by the pallet changer.

According to the present invention, a circular groove is provided on the bottom surface of the pallet and plate members having a shape corresponding to the groove are provided on the pallet changer body and the machine tool table. Rotating means for rotatable driving the pallet is provided, and a guide means is provided for guiding the path of movement of the pallet. The rotating means is driven to move the pallet along the defined path whereby the pallet is transferred between the pallet changer body and the machine tool table.

When the rotating means is operated for the replacement of a pallet, the pallet rotates and moves so that the pallet is guided by the plate members, having a shape corresponding to the circular groove, and a guide rail. Since the replacement of a pallet is effected by the rotating movement as described, the pallet supported on the plate of the pallet body and the pallet supported on the plate of the machine tool table can be simultaneously moved to exchange their positions.

EMBODIMENT

An embodiment of the present invention will be described hereinbelow with reference to the drawings.

Figure 1:
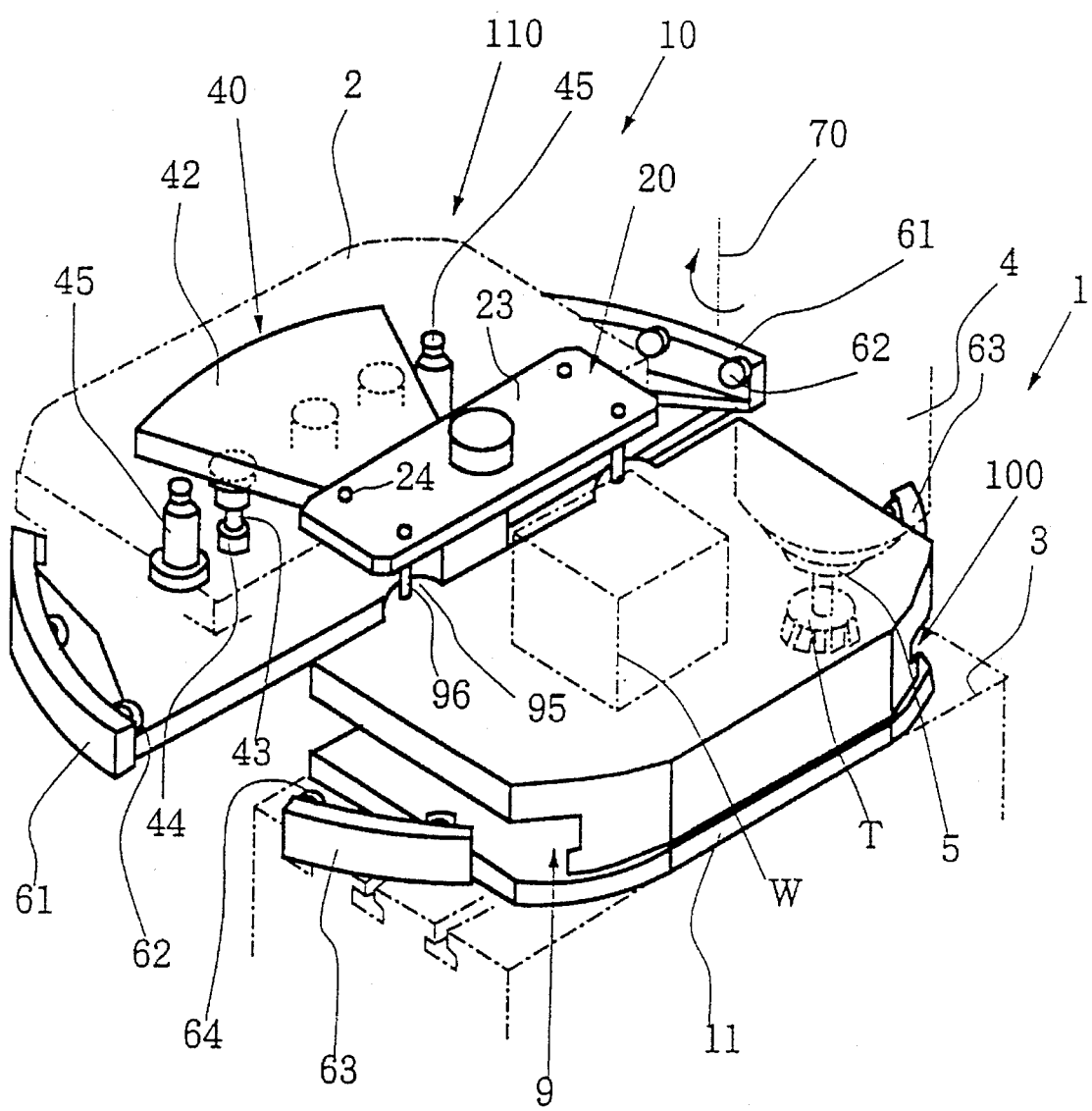
FIG. 1 is a perspective view of the exterior of a pallet changer according to the present invention.
Figure 2:
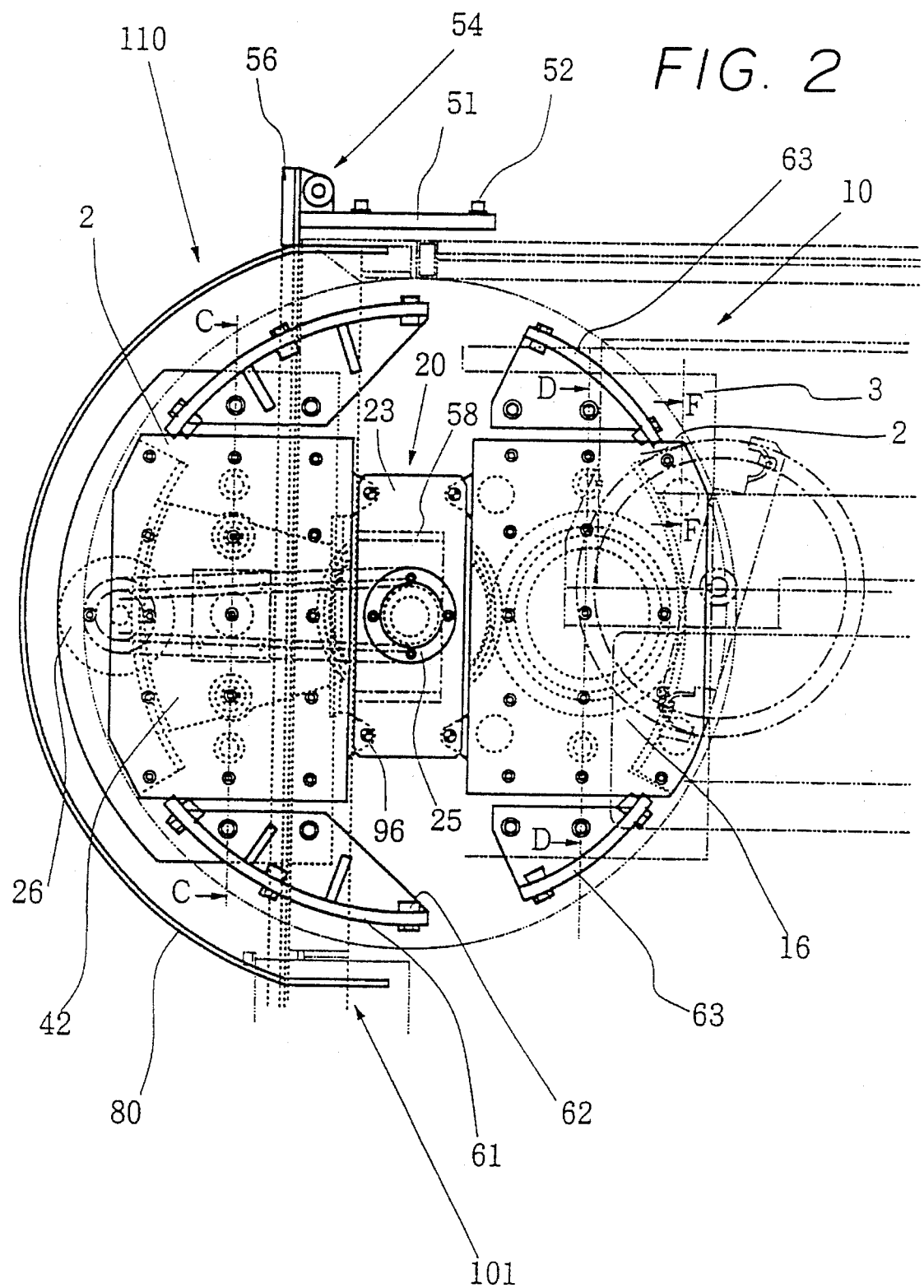
FIG. 2 is a top view of the pallet changer according to the present invention.
Figure 3:
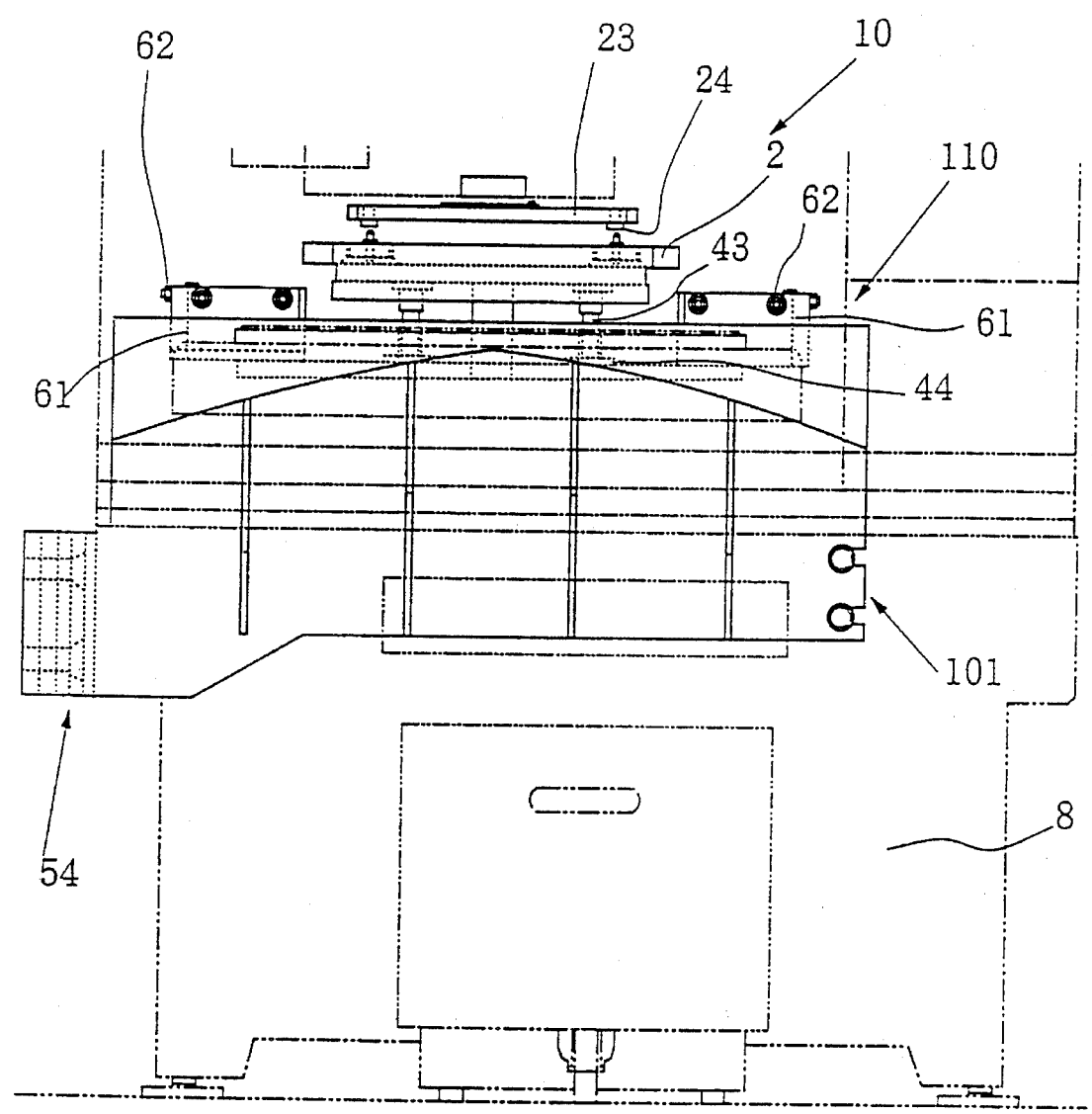
FIG. 3 is a front view of the pallet changer according to the present invention.
Figure 4:
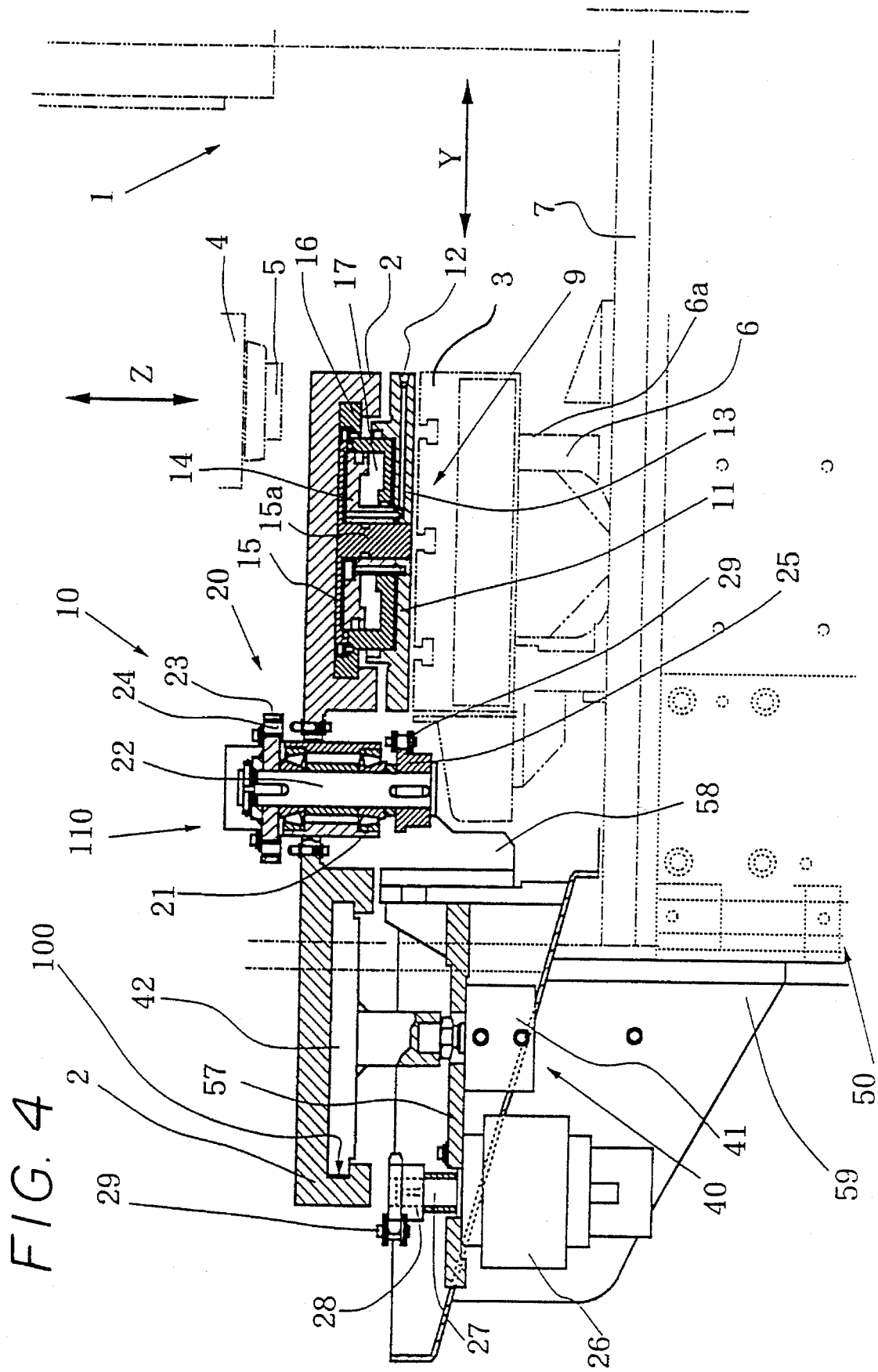
FIG. 4 is a sectional view of the pallet changer according to the present invention.
Figure 5:
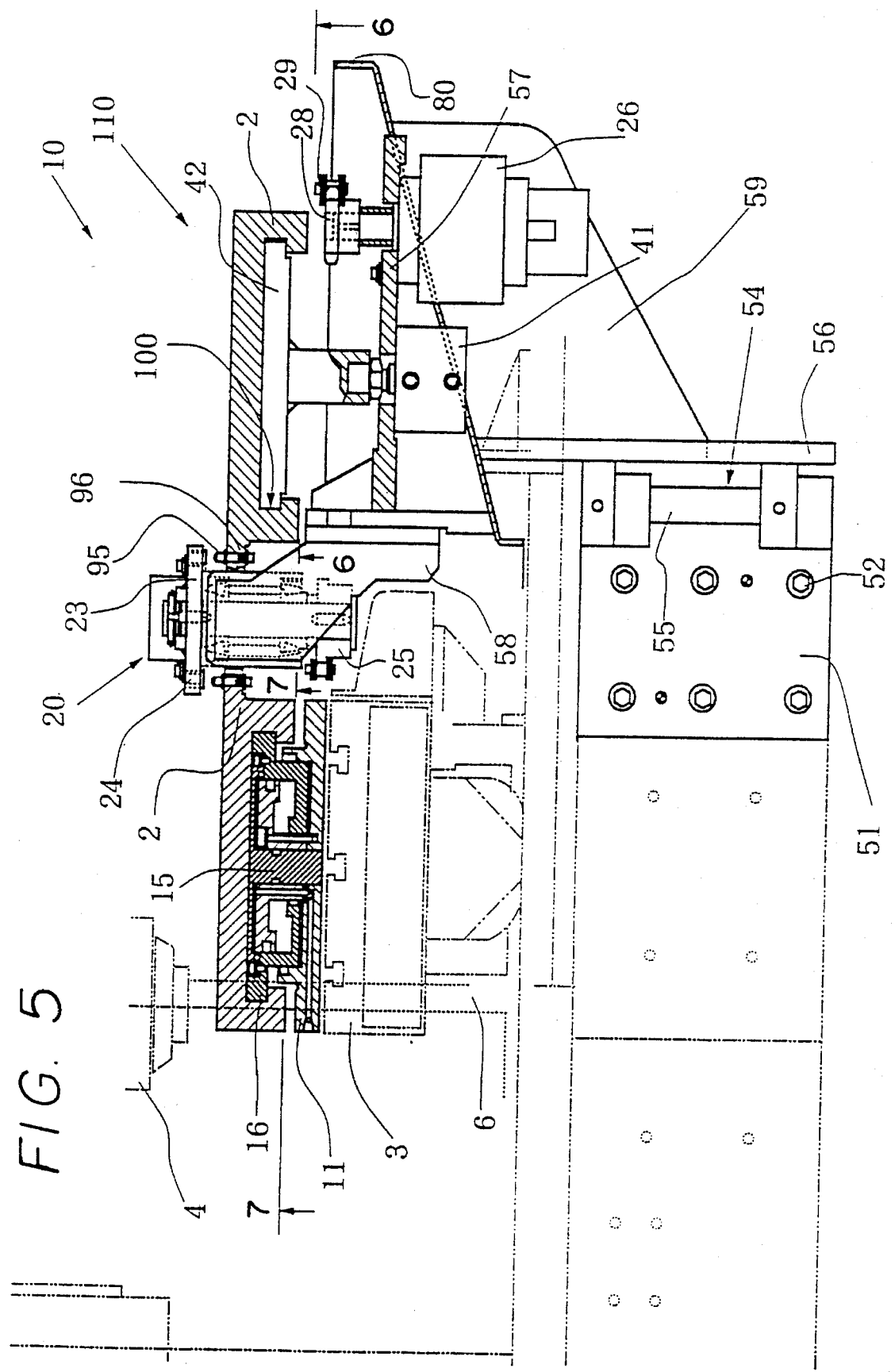
FIG. 5 is a sectional view taken along C—C of FIG. 2.

FIG. 1 is a perspective view showing the exterior appearance of a pallet changer 10 according to the present invention, FIG. 2 is a top view of the pallet changer 10, FIG. 3 is a front view thereof, and FIGS. 4 and 5 are respective sectional views thereof.

The pallet changer 10 is set, for example, on a base 8 (see FIG. 3) of a longitudinal type machining center 1 or in the vicinity thereof. The machining center 1 includes the base 8, on which a column is provided. A spindle head 4 is set on the column. The spindle head 4 is movable in a vertical Z direction (see FIG. 4). A spindle 5 is provided on the spindle head 4. A tool changer for replacing a tool used by the spindle 5 is arranged in the vicinity of the spindle head 4. As shown in FIG. 4, rail 7 is secured onto the base 8 along the Y direction, and a saddle 6 is set on the rail 7. The saddle 6 can be moved in the Y direction by a moving means (not shown) having a feed screw. Above the saddle 6 is formed a rail 6a extending in the X direction, and an XY table 3 is set on the rail 6a. The XY table 3 is movable in the X direction along the rail 6a. A pallet fixing means 9 is provided on the XY table 3.

Figure 9:
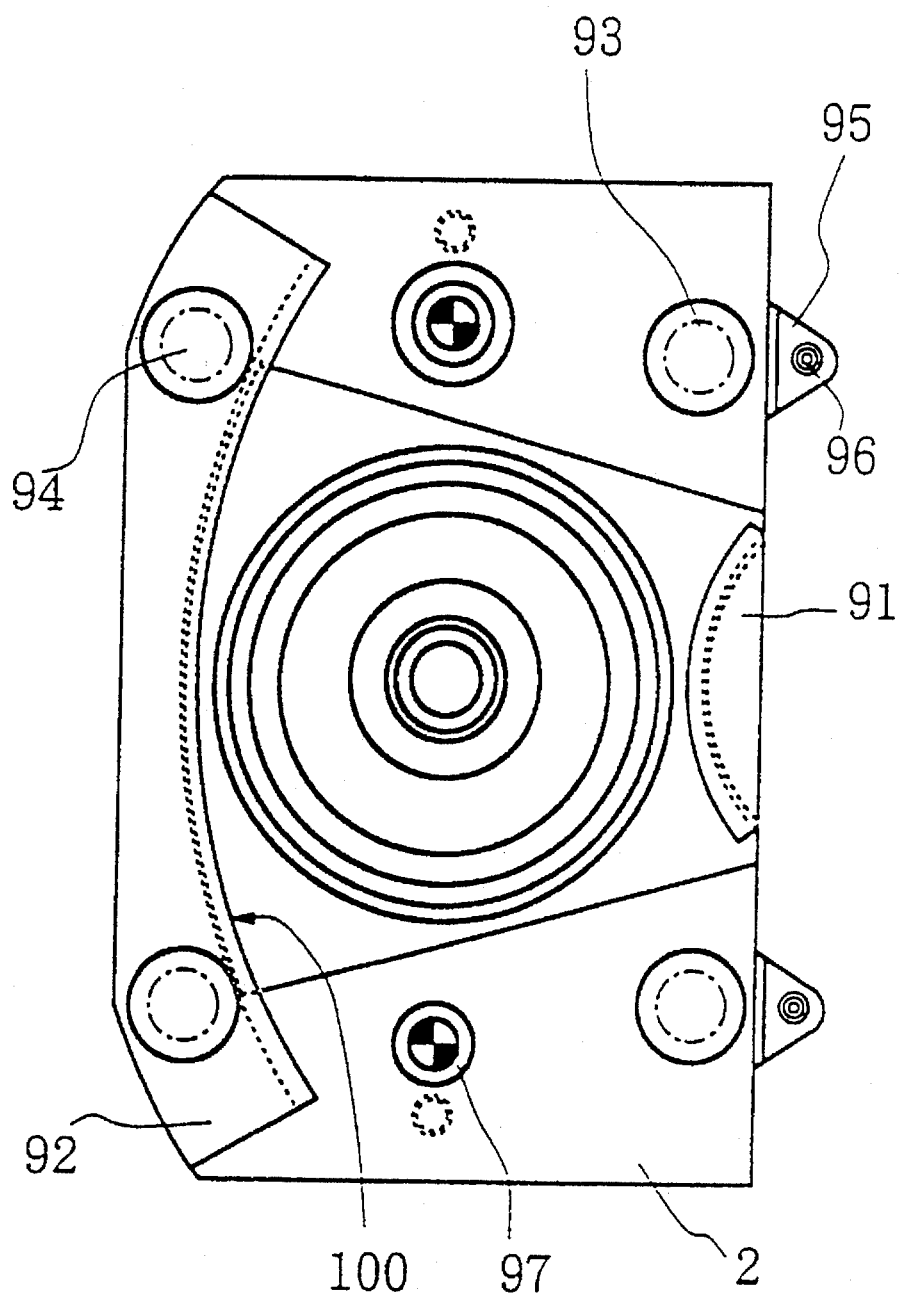
FIG. 9 is a sectional view taken along A—A of FIG. 5.
Figure 10:
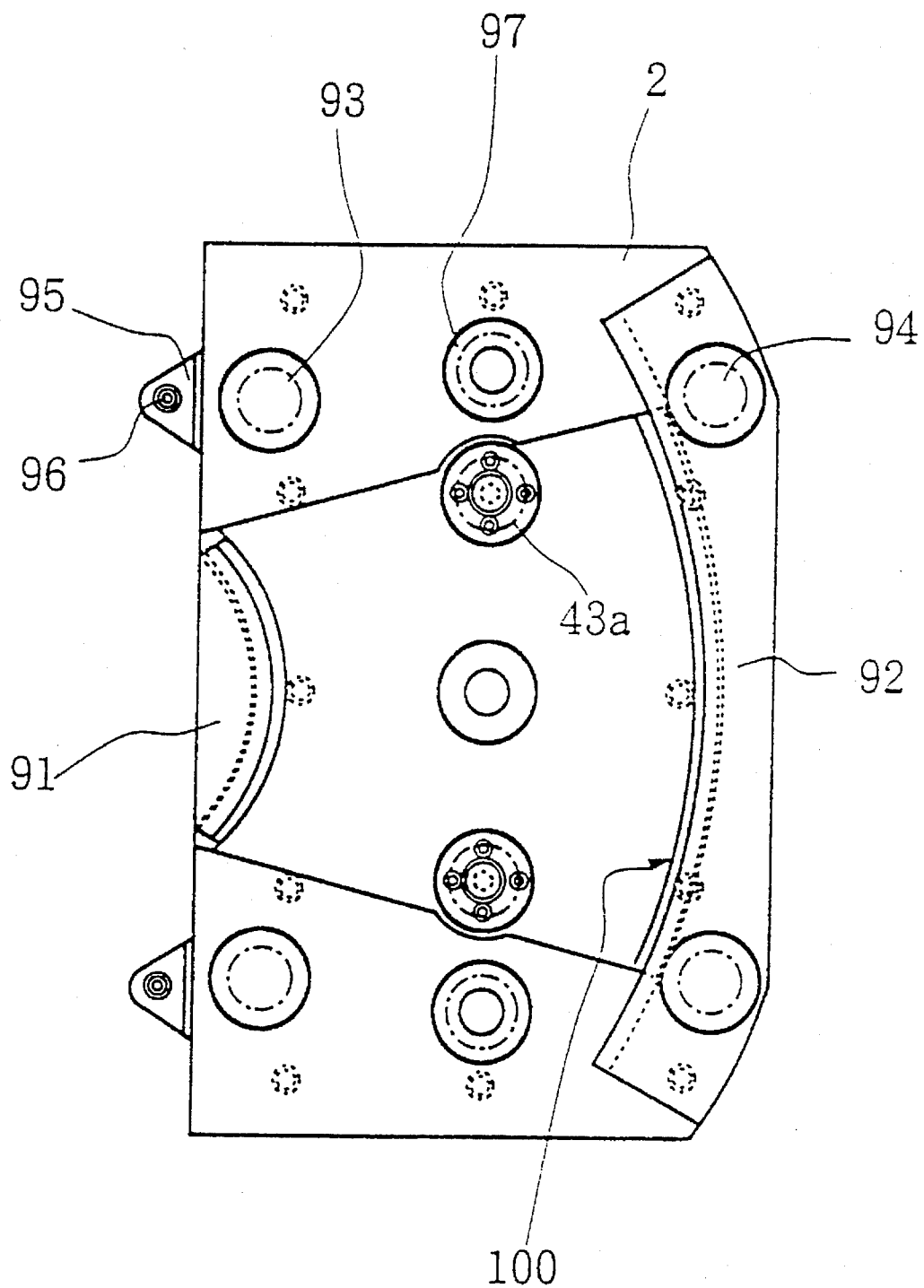
FIG. 10 is a plan view showing the pallet of FIG. 5.

As shown in FIGS. 9 and 10, protrusions 91 and 92 are provided under the pallet 2, and a circular groove 100 is formed therebetween. Two extensions 95 are formed on the side surface of the protrusion 91, and a pin 96 vertical to the pallet surface is secured to the upper surface of the protrusion. Bushes 93, 94 and 97 are provided on the lower surface of the pallet 2, which bushes cooperate with locating pins in clamping.

The pallet fixing means 9 is of a so-called cylinder-piston construction. As shown in FIG. 4, a fixing base 11 is fixed to the XY table 3. The fixing base 11 is in the shape of a plate as shown in FIGS. 3 and 4, and has a circular through-hole in the center thereof.

The body of a piston 14 is secured to a point on the periphery of the through-hole. The piston 14 comprises a plate portion and a body portion, and a through-hole is formed in the center axis thereof. This through-hole communicates with the through-hole of the fixing base 11.

A foot portion 15a of a piston guide 15 is slidably engaged with the through-hole. The piston guide 15 has a shape in which the cylindrical foot portion 15a projects from the central portion of the lower surface of the disk-like plate.

The top of a deep plate-like clamp plate 16 is oil-sealed and secured to an outer edge portion of the plate of the piston guide 15. The external form of the top of the clamp plate 16 is the shape of a fan as shown in FIG. 2.

A through-hole is formed in the center of the bottom of the clamp plate 16, and the wall surface of the hole is slidably and oil-tightly engaged with the body of the inner piston 14. An area between the top and bottom of the clamp plate 16 constitutes a cylindrical wall, which wall is slidably and oil-tightly engaged with the outer peripheral surface of the plate portion of the inner piston An oil chamber 17 is defined by the clamp plate 16 and the inner piston 14. A pipe 13 communicates with the oil chamber 17, passing from an inlet 12 in the outer periphery of the fixing base 11 to the body of the inner piston 14. When the oil chamber 17 is filled with oil through the pipe 13 from an oil pressure source (not shown), the clamp plate 16 moves to the lowest position, and the lower surface of the bottom wall thereof is pressed against the upper surface of the fixed base 12 and thereby clamped. On the contrary, when oil is removed from the oil chamber 17, the clamp plate moves up to unclamped stated.

The pallet changer 10 has frames 56, 57, 58 and 59 rigidly connected. A rotating mechanism 20 is mounted on the frame 58. The rotating mechanism 20 causes two pallets to be rotated simultaneously, in this embodiment.

A vertical rotational shaft 22 is rotatably supported by the frame 58 through a taper bearing 21.

An elongated rectangular plate 23 is secured to the upper portion of the rotational shaft 22. The plate 23, in the vicinity of corners thereof, has through-holes through which are inserted respective bushes 24. A sprocket 25 is secured to the lower end of the rotational shaft 22.

An air actuator 26 for driving the rotational shaft is secured to the lower surface of a horizontal frame 57. A sprocket 28 is secured to an output shaft 27 of the actuator 26. A chain 29 extends between the sprocket 28 and the sprocket 25 at the lower end of the rotational shaft 22. When the actuator 26 is driven, the rotation of the sprocket 27 is transmitted to the rotational shaft 22 through the sprockets 28, 25 and the chain 29.

A lift means 40 for vertically moving the pallet 2 is fixed to the frame 57. The lift means 40 moves the plate 42 by means of an air cylinder 41.

Figure 6:
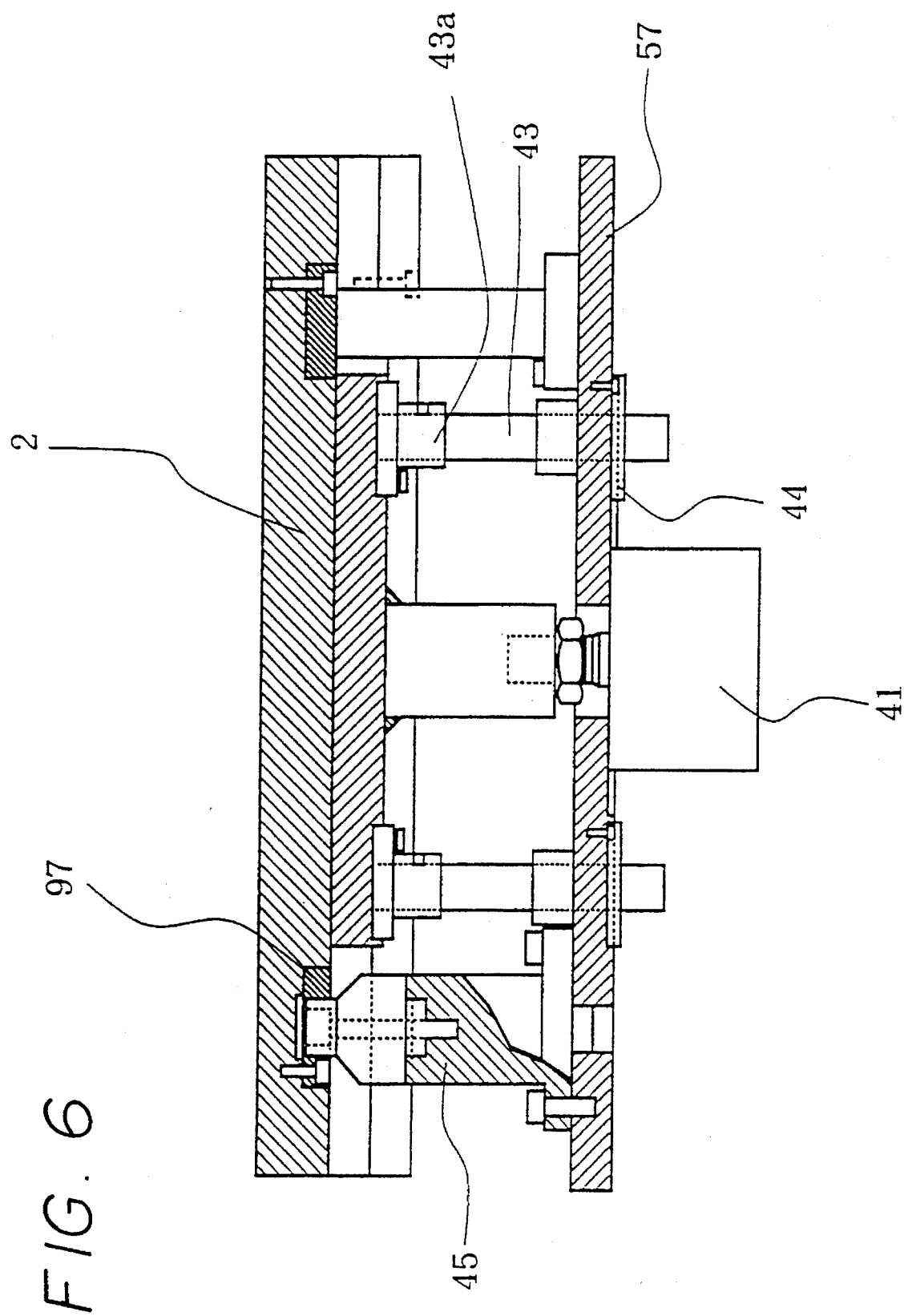
FIG. 6 is a sectional view taken along D—D of FIG. 2.
Figure 7:
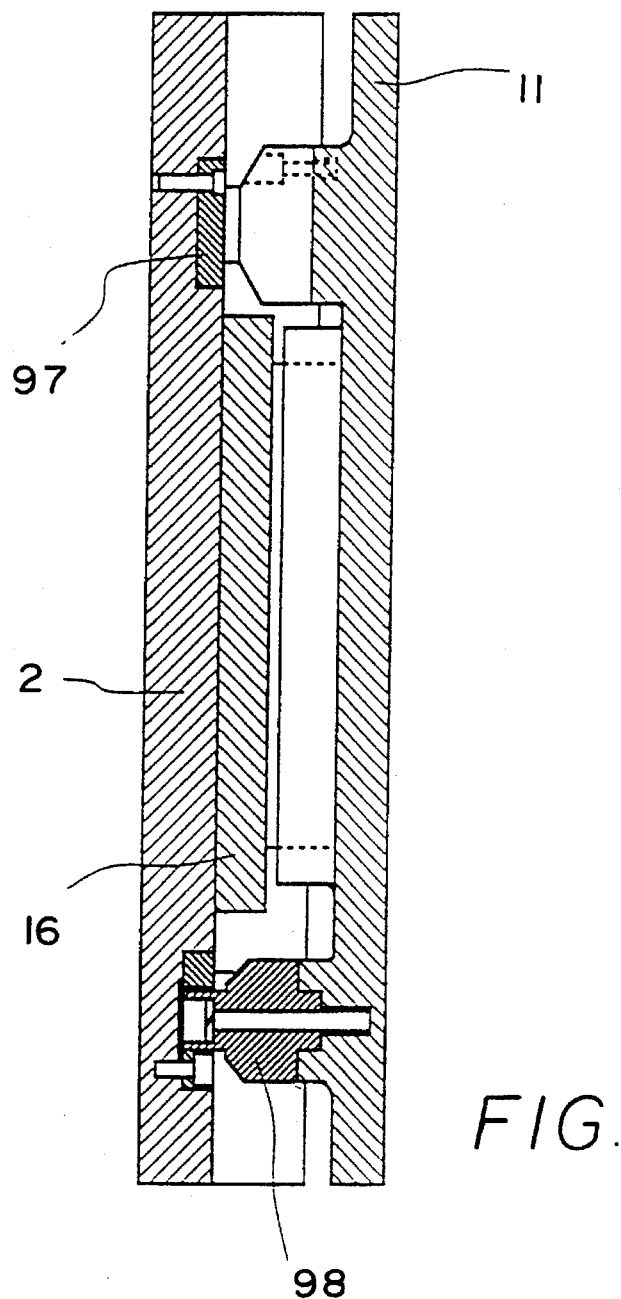
FIG. 7 is a sectional view taken along F—F of FIG. 2.
Figure 8:
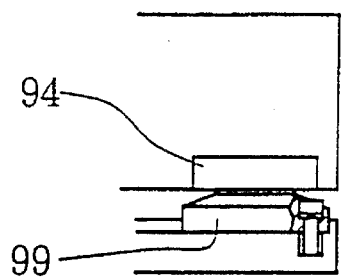
FIG. 8 is a sectional view taken along B—B of FIG. 5.

Two linear shafts 43 are vertically secured to the lower surface of the plate 42 as shown in FIG. 6. Linear bushes corresponding to the linear shafts 43 are arranged on the frame 57. The linear shafts 43 are engaged with the linear bushes 44 so that the linear shafts 43 are slidably moved to guide the operation of the plate 42.

Engaging pins 45 are vertically fixed adjacent to the outside of the linear bushes 44 of the frame 57. When the pallet 2 engaged with the plate 42 is moved downward by the lift means 40 to become clamped, the ends of the engaging pins 45 are inserted into engaging bushes 97 on the lower surface of the pallet 2. On the contrary, when in the unclamped state, the ends of the engaging pins 45 are disengaged from the engaging bushes 97.

A frame 56 is hinge-connected to the base 8 of the machining center. That is, a hinge plate 51 is secured to the base 8 by a bolt 52 to form a hinge connection 54 between the hinge plate 51 and the frame 56. Accordingly, the frame 56 is pivotable about a hinge shaft 55. Since the frames 56 and 57–59 are integrally connected, the pallet changer body 110 as a whole can turn about the hinge shaft 55. On the side opposite the hinge-connection 54, a fixing means for fixing the pallet changer body 110 is provided (see FIG. 3).

A circular guide rail 61 is arranged in the vicinity of horizontally opposite ends of the upper surface of the frame 57. A roller 62 is rotatably provided in the vicinity of the upper portion of the guide rail 61. A head portion of the roller 62 projects slightly from the upper surface of the guide rail 61. Two guide rails 63 similar to the former are also arranged on the table 3 of the machining center. These guide rails 61 and 63 are arranged in a circle about the rotational shaft of the plate 23.

The levels of the guide rails 61 and 63 are set so that when the plates 42 and 16 of the lift means 40 and the fixing means 9 are at the uppermost position, they engage the bottom of the pallet 2 set thereon. Accordingly, when the plates 42 and 16 are moved to the uppermost position to rotate the pallet 2 by the rotating mechanism 20, the pallet 2 can be smoothly moved from the plates 42 and 16 onto the guide rails 61 and 63 and thence from the guide rails 61 and 63 onto the plates 42 and 16.

The operation of the pallet changer 10 will be briefly explained hereinbelow.

FIGS. 4 and 5 show the pallets 2 on the plates 42 and 16, and the pallets 2, slightly released from the clamping state. A pallet carrying a workpiece to be next processed is mounted on the plate 42, and a pallet having a finished work is mounted on the plate 16.

The air cylinder 41 is then operated by bleeding oil from the oil chamber 17 whereby the plates 42 and 16 are moved upward. The plates 42 and 16 are moved upward until the pins 96 of the pallet 2 firmly engage the bushes 24 provided on the plate 23 of the rotating mechanism 20. When the pins 96 engage the bushes 24, the plates 42 and 16 are stopped at that height.

Next, the actuator 26 of the rotating mechanism 230 is driven to rotate the plate 23 180 degrees. Since the pins 96 of the pallet 2 are engaged with the bushes 24 of the plate 23, the pallet 2 also rotates along with the plate 23. Thus, both the pallets 2 move through a semi-circle to the opposite plates 16 and 24, via the guide rails 61 and 63. By this rotating movement, the pallets are exchanged between the plates 42 and 16, and the used pallet is mounted on the plate 42 whereas a pallet to be used next is mounted on the plate 16.

Next, the air cylinder 41 is operated to feed oil into the oil chamber 17 whereby the plates 42 and 16 are moved down to clamp the respective pallets. At this time, the bushes 93, 94 and 97 on the lower surface are engaged with the locating pins 98, 99 and 45, whereby the pallets are positively clamped. After the pallets have been clamped, processing is carried out by the tool set to the spindle.

At this time, the fixing means 101 is released to turn the pallet changer body 110 about the hinge shaft 55, whereby the operator can move close to the table of the machine tool.

It is to be noted that a drive source used in the present invention is not limited to one making use of air or oil as previously mentioned, but one making use of electricity such as a servo motor may also be used.

According to the present invention, there is provided an arrangement wherein a pallet is rotatably exchanged between the plate on the side of the pallet changer body and the plate on the side of the table of the machine tool, and therefore, the exchange of the pallets can be performed by a series of operations. Accordingly, the pallet replacing operation can be speeded up.

Further, since the pallet changer body can be turned out of the way, the operator can move close to the table of the machine tool without being hindered by the pallet changer.

It is to be noted that the present invention is not limited to the above-described embodiment. For example, the pallet changer can be constructed so that 3 pallets may be mounted thereon. In this case also, it is obvious that the replacement of pallets can likewise be done rapidly.

I claim:

1. A pallet changing apparatus comprising:

a machine tool table for machining a workpiece;

a pallet having a lower surface with a circular groove formed therein;

a pallet changer for placing said pallet on said machine tool table and for removing said pallet from said machine tool table;

a frame supporting said pallet changer;

hinge means for swinging said pallet changer relative to said frame between an operative position adjacent said machine tool table and an inoperative position remote from said machine tool table;

fixing means for locking said pallet changer in said operative position;

a first plate member on said pallet changer and a second plate member on said machine tool table, each of said first and second plate members having circular edges and mating with said circular groove of said pallet;

rotating means for rotating said pallet between a first position wherein said pallet is mounted on said first plate member and a second position wherein said pallet is mounted on said second plate member; and guide means for guiding said pallet during movement between said first and second positions.

2. A pallet changing apparatus in accordance with claim 1 wherein said rotating means comprises a chain drive mechanism.

3. A pallet changing apparatus in accordance with claim 1 wherein said frame has a bottom sloped upward from said hinge means for facilitating said swinging movement of said pallet changer.

* * * * *